US006832484B2

(12) United States Patent
Hofmann et al.

(10) Patent No.: US 6,832,484 B2
(45) Date of Patent: Dec. 21, 2004

(54) HEAT-SHIELD BRICK, COMBUSTION CHAMBER COMPRISING AN INTERNAL, COMBUSTION CHAMBER LINING AND A GAS TURBINE

(75) Inventors: Daniel Hofmann, Orlando, FL (US); Paul-Heinz Jeppel, Waltrop (DE); Hans Maghon, Mülheim A.D. Ruhr (DE); Uwe Rettig, München (DE); Milan Schmahl, Mülheim A.D. Ruhr (DE); Christine Taut, Dresden (DE)

(73) Assignee: Siemens Aktiengesellschaft, Munich (DE)

( * ) Notice: Subject to any disclaimer, the term of this patent is extended or adjusted under 35 U.S.C. 154(b) by 81 days.

(21) Appl. No.: 10/380,969

(22) PCT Filed: Sep. 18, 2001

(86) PCT No.: PCT/EP01/10790

§ 371 (c)(1),
(2), (4) Date: Mar. 21, 2003

(87) PCT Pub. No.: WO02/25173

PCT Pub. Date: Mar. 28, 2002

(65) Prior Publication Data

US 2003/0177770 A1 Sep. 25, 2003

(30) Foreign Application Priority Data

Sep. 22, 2000 (EP) .......................................... 00120788

(51) Int. Cl.[7] .............................. F02C 1/00; F02G 3/00

(52) U.S. Cl. .......................................... 60/752; 60/753

(58) Field of Search .................... 60/752–760; 110/336, 110/338

(56) References Cited

U.S. PATENT DOCUMENTS

| | | | | | |
|---|---|---|---|---|---|
| 1,252,415 | A | * | 1/1918 | Duckham | 52/232 |
| 1,328,380 | A | * | 1/1920 | Laird | 266/283 |
| 2,853,872 | A | * | 9/1958 | Glenn | 52/601 |
| 3,665,870 | A | | 5/1972 | Lewicki | |
| 4,193,355 | A | * | 3/1980 | Dondeyne et al. | 110/336 |
| 4,334,858 | A | | 6/1982 | Iiyama et al. | |
| 4,779,548 | A | * | 10/1988 | Mueller et al. | 110/336 |
| 4,835,831 | A | | 6/1989 | Melton | |
| 4,840,131 | A | | 6/1989 | Meumann et al. | |
| 5,063,028 | A | * | 11/1991 | Humble et al. | 422/144 |
| 5,063,861 | A | * | 11/1991 | Imogawa et al. | 110/336 |
| 5,083,424 | A | * | 1/1992 | Becker | 60/796 |
| 5,605,046 | A | * | 2/1997 | Liang | 60/752 |
| 5,799,491 | A | * | 9/1998 | Bell et al. | 60/752 |
| 6,112,970 | A | * | 9/2000 | Takahashi | 228/42 |
| 6,675,586 | B2 | * | 1/2004 | Maghon | 60/796 |
| 6,705,241 | B2 | * | 3/2004 | Abdullah et al. | 110/334 |
| 6,711,899 | B2 | * | 3/2004 | Bast et al. | 60/752 |
| 2003/0079475 | A1 | * | 5/2003 | Schmahl et al. | 60/752 |
| 2003/0167985 | A1 | * | 9/2003 | Abdullah et al. | 110/334 |
| 2003/0172856 | A1 | * | 9/2003 | Hofmann et al. | 110/338 |
| 2004/0050060 | A1 | * | 3/2004 | Taut | 60/752 |

FOREIGN PATENT DOCUMENTS

| | | |
|---|---|---|
| DE | 30 30 714 | 2/1982 |
| DE | 3030714 | 2/1982 |
| DE | 43 14 160 | 11/1993 |
| DE | 4314160 | 11/1993 |
| EP | 0 419 487 | 11/1994 |
| EP | 0 724 116 | 7/1996 |
| FR | 1 347 970 | 12/1962 |
| FR | 1347970 | 4/1964 |
| WO | WO 99/47874 | 9/1999 |

* cited by examiner

*Primary Examiner*—Justine R. Yu
*Assistant Examiner*—William H. Rodriguez
(74) *Attorney, Agent, or Firm*—Harness, Dickey & Pierce, P.L.C.

(57) ABSTRACT

The invention relates to a heat-shield brick, in particular for lining a combustion chamber wall, comprising a hot side that can be exposed to a hot medium, a wall side that lies opposite said hot side and a peripheral side that lies adjacent to the hot side and the wall side and that has peripheral lateral face. A tensioning element, pre-stressed in the peripheral direction is provided on the peripheral side, whereby a compressive stress generated perpendicularly to the peripheral lateral face. The invention also relates to a combustion chamber comprising a combustion chamber lining, which has heat-shield bricks of this type and to a gas turbine comprising a combustion chamber.

20 Claims, 4 Drawing Sheets

HEAT-SHIELD BRICK, COMBUSTION CHAMBER COMPRISING AN INTERNAL, COMBUSTION CHAMBER LINING AND A GAS TURBINE

This application is the national phase under 35 U.S.C. § 371 of PCT International Application No. PCT/EP01/10790 which has an International filing date of Sep. 18, 2001, which designated the United States of America and which claims priority on German Patent Application number EP 00120788.5 filed Sep. 22, 2000, the entire contents of which are hereby incorporated herein by reference.

FIELD OF THE INVENTION

The present invention generally relates to a heat shield brick, in particular a heat shield brick for lining a combustion chamber wall. The brick may have a hot side which can be exposed to a hot medium, a wall side opposite the hot side, and a peripheral side which can adjoin the hot side and the wall side, and a peripheral-side surface. The present invention also generally relates to a combustion chamber having an inner combustion chamber lining and to a gas turbine.

BACKGROUND OF THE INVENTION

A thermally and/or thermomechanically highly loaded combustion space, such as, for example, a furnace, a hot gas duct, or a combustion chamber of a gas turbine, in which a hot medium is produced and/or directed is provided with an appropriate lining for protection from excessive thermal stressing. The lining is normally made of a heat-resistant material and protects a wall of the combustion chamber from direct contact with the hot medium and the associated high thermal loading.

U.S. Pat. No. 4,840,131 relates to a fastening of ceramic lining elements on a wall of a furnace. In this case, a rail system which is fastened to the wall and has a plurality of ceramic rail elements is provided. The lining elements can be mounted on the wall by the rail system. Further ceramic layers may be provided between a lining element and the wall of the furnace, inter alia a layer of loose, partly compressed ceramic fibers, this layer having at least approximately the same thickness as the ceramic lining elements or a greater thickness. The lining elements in this case have a rectangular shape with a planar surface and are made of a heat-insulating, refractory ceramic fiber material.

U.S. Pat. No. 4,835,831 likewise deals with the application of a refractory lining to a wall of a furnace, in particular to a vertically arranged wall. A layer consisting of glass fibers, ceramic fibers or mineral fibers is applied to the metallic wall of the furnace. This layer is fastened to the wall by metallic clips or by adhesive. A wire mesh net with honeycomb meshes is applied to this layer. The mesh net likewise serves to prevent the layer of ceramic fibers from falling down. By means of a suitable spraying process, a uniform closed surface of refractory material is applied to the layer thus fastened. The method described largely prevents a situation in which refractory particles striking during the spraying are thrown back, as would be the case with direct spraying of the refractory particles onto the metallic wall.

A ceramic lining of the walls of thermally highly stressed combustion spaces, for example of gas-turbine combustion chambers, is described in EP 0 724 116 A2. The lining consists of wall elements of high-temperature-resistant structural ceramic, such as, for example, silicon carbide (SiC) or silicon nitride ($Si_3N_4$). The wall elements are elastically fastened to a metallic supporting structure (wall) of the combustion chamber in a mechanical manner by means of a central fastening bolt. A thick thermal insulating layer is provided between the wall element and the wall of the combustion space, so that the wall element is at a corresponding distance from the wall of the combustion chamber. The insulating layer, which is about three times as thick in relation to the wall element, is made of a ceramic fiber material which is prefabricated in blocks. The dimensions and the external shape of the wall elements can be adapted to the geometry of the space to be lined.

Another type of lining of a thermally highly loaded combustion space is specified in EP 0 419 487 B1. The lining includes heat shield elements which are mechanically mounted on a metallic wall of the combustion space. The heat shield elements touch the metallic wall directly. In order to avoid excessive heating of the wall, e.g. as a result of direct heat transfer from the heat shield element or by introducing hot medium into the gaps formed by the heat shield elements adjoining one another, cooling air, the "sealing air", is admitted to the space formed by the wall of the combustion space and the heat shield element. The sealing air prevents the penetration of hot medium up to the wall and at the same time cools the wall and the heat shield element.

WO 99/47874 relates to a wall segment for a combustion space and to a combustion space of a gas turbine. Specified in this case is a wall segment for a combustion space which can be acted upon by a hot fluid, e.g. a hot gas, having a metallic supporting structure and a heat protection element fastened to the metallic supporting structure. Inserted between the metallic supporting structure and the heat protection element is a deformable separating layer which is intended to absorb and largely compensate for possible relative movements of the heat protection element and the supporting structure. Such relative movements may be caused, for example, in the combustion chamber of a gas turbine, in particular in an annular combustion chamber, by different thermal expansion behavior of the materials used or by pulsations in the combustion space, which may arise during irregular combustion for producing the hot working medium or by resonance effects. At the same time, the separating layer causes the relatively inelastic heat protection element to rest in a more planar manner overall on the separating layer and the metallic supporting structure, since the heat protection element partly penetrates into the separating layer. The separating layer can thus compensate for production-related unevenness at the supporting structure and/or the heat protection element, which unevenness may lead locally to an unfavorable concentrated introduction of force.

SUMMARY OF THE INVENTION

An embodiment of the present invention is based on the observation that, in particular ceramic, heat shield bricks, on account of their requisite flexibility with regard to thermal expansions, are often only inadequately protected against mechanical loads, such as shocks or vibrations for example.

An object of the present invention is accordingly to specify a heat shield brick which ensures high operating reliability with regard to both unrestricted thermal expansion and stability relative to mechanical, in particular shock-like, loads. A further object of the present invention is to specify a combustion chamber having an inner combustion chamber lining and to specify a gas turbine having a combustion chamber.

An embodiment of the present invention provides a heat shield brick, in particular for lining a combustion chamber wall, having a hot side which can be exposed to a hot medium, a wall side opposite the hot side, and a peripheral side which adjoins the hot side and the wall side and has a peripheral-side surface. A tension element prestressed in the peripheral direction is provided on the peripheral side, a compressive stress normal to the peripheral-side surface being produced.

An embodiment of the present invention provides lasting protection for heat shield bricks against high accelerations as a result of shocks or vibrations. In this case, the present invention is already based on the knowledge that steady and/or transient vibrations in a combustion chamber wall induce corresponding vibrations in combustion chamber bricks as normally used for lining said combustion chamber wall. In this case, considerable accelerations above a limit acceleration may occur, in particular in the event of resonance, in the course of which the heat shield bricks lift from the combustion chamber wall and consequently strike again. Such striking on the solid or also partly damped combustion chamber wall leads to very high forces on the heat shield bricks and may cause considerable damage, e.g. fracture of the latter. There is also the high thermal loading of the heat shield brick on account of the admission of a hot medium to the heat shield brick during operation. Incipient cracks may therefore occur on both the wall side and the hot side of the heat shield brick, there also being the risk of material being released from the heat shield brick. This leads to a considerable reduction in the endurance of a heat shield brick, in particular because such incipient cracks may lead to a crack through the material and thus to a fracture and thus failure of the entire heat shield brick. Consequently, there is the risk of fragments passing into the combustion space and causing massive damage to further components of the combustion chamber or, for example during use in a gas turbine, to the sensitive blading region having turbine blades.

With the proposed heat shield brick having a tension element prestressed in the peripheral direction at the peripheral side, extremely efficient protection, with long-term stability, for a heat shield brick is specified for the first time. The tension element is prestressed in the peripheral direction, a certain compressive stress normal to the peripheral-side surface being produced. By this normal force, which is directed in the direction of the interior of the heat shield brick in its center, the heat shield brick is secured even at very low normal forces. In this way, an incipient crack in the material, for example as a result of shock loading, is effectively countered. Existing incipient cracks in the material, given an appropriate arrangement and configuration of the tension element, cannot develop or expand, or can only do so to a limited extent. The tension element holds the heat shield brick together, as it were, and protects it against incipient cracks in the material, on the one hand, and in particular against a crack right through the material, on the other hand. In addition, the risk of smaller or larger fragments being released or falling out in the event of a possible crack through the material is effectively countered.

By the provision of the tension element on the peripheral side of the heat shield brick, vibrations and/or shock loads with a component normal to the peripheral-side surface are advantageously damped. Given an appropriate configuration and choice of material for the tension element, the damping constant can be set in accordance with the loads which occur. Such shock loads normal to the peripheral-side surface may occur, for example, in the arrangement of a plurality of heat shield bricks as a result of the relative movement of adjacent heat shield bricks. By this damping, prolonged use of the heat shield brick can be ensured.

Especially advantageous is the increase in the passive safety of the combustion chamber brick compared with the conventional configurations. An incipient crack in the material or a crack through the material is countered, release of fragments of the combustion chamber brick being largely prevented in the event of a crack through the material.

Furthermore, the configuration of the heat shield brick with the tension element results in the advantage of problem-free prefabrication and ease of assembly of the heat shield brick, for example for fitting in a combustion chamber wall. The tension element is simply attached at the peripheral side and prestressed in the peripheral direction according to requirements. Separate damping and/or protective elements, as can additionally be found in conventional heat shield bricks, require a considerably greater assembly and adjusting effort compared with the heat shield brick of the invention. During an inspection, possibly only the heat shield brick has to be exchanged, but not additional protective elements. This high flexibility on the one hand and the attainable endurance of the heat shield brick on the other hand are also especially advantageous from the economic point of view. In particular, inspection or maintenance intervals for the heat shield brick, for example when used in a combustion chamber of a gas turbine, are extended. If a heat shield brick fractures, operation need not be stopped immediately for inspecting the plant, since, on account of the increased passive safety, continued operation up to the regular inspection interval or beyond this is possible.

The compressive stress which is produced normal to the peripheral-side surface is advantageously adjustable by appropriate prestressing of the tension element.

According to an embodiment of the present invention, the tension element extends at least zonally in the peripheral direction. As a result of the respective geometry of the heat shield brick, for example in the form of prisms having a polygonal base area, various regions can be formed on the peripheral side, which has the peripheral-side surface. So that the tension element can develop its full effect for increasing the passive safety of the combustion chamber brick, it is appropriate for the tension element to extend at least zonally, in particular even so as to overlap in regions, in the peripheral direction. Thus a corresponding compressive stress normal to the peripheral-side surface can be produced in a region.

A plurality of tension elements are preferably provided. The arrangement and configuration of the tension elements on the peripheral side can be effected in a very flexible manner by the use of a plurality of tension elements. By the use of a plurality of tension elements, critical regions of the heat shield brick, for example corners or edges, in which an incipient crack or rupture, or release of possible fragments, would be expected, can be specifically protected. As a result, the operational reliability of the heat shield brick is further increased.

According to an embodiment of the present invention, a tension element completely encloses the peripheral-side surface. By this configuration, a protective normal force on the peripheral-side surface is ensured over the entire periphery of the heat shield brick. A complete ring closure, as it were, is achieved, the heat shield brick overall being advantageously passively protected in a comprehensive manner by the forces directed locally into the interior of the heat shield brick. Even one tension element like this which completely encloses the peripheral-side surface can ensure this.

Depending on the loading case, however, a plurality of such tension elements completely enclosing the peripheral-side surface can be attached.

The tension element preferably encloses the peripheral-side surface several times. A tension element enclosing the peripheral surface several times correspondingly multiplies the protective effect of the tension element, the protective forces directed normal to the peripheral-side surface being increased. By this multiple enclosure, the tension element forms, as it were, multiple reinforcement of the heat shield brick on the peripheral side. By this multiple protection, especially high operating reliability is achieved, with the economic advantages already discussed further above.

The peripheral side also preferably has a peripheral groove in which the tension element engages. In this case, the peripheral groove is advantageously formed over the entire periphery on the peripheral side, for example by appropriate stock removal from the heat shield brick or by shaping the peripheral groove when producing the heat shield brick from a, for example ceramic, molding compound. The heat shield brick is protected in a very effective manner by the engagement of the tension element in the peripheral groove, the tension element in the peripheral groove being additionally protected from direct admission of a hot gas, as is provided in the operating case. Furthermore, the peripheral groove protects the tension element from falling out or, provided a plurality of tension elements are used, protects the tension elements engaging in the peripheral groove from falling out. The peripheral groove advantageously extends over the entire periphery of the heat shield brick. In an alternative configuration, however, it is possible for the peripheral groove not to be formed over the entire periphery of the heat shield brick but only in a section of the peripheral side which can be selected in each case.

At least one further peripheral groove which is at a distance from the peripheral groove is also preferably provided, a tension element engaging in the further peripheral groove. In this case, the peripheral groove may be provided, for example, on that end of the peripheral side which faces the hot side of the combustion chamber brick, whereas the further peripheral groove is provided on that end of the peripheral side which faces the wall side. Multiple protection with peripheral grooves in which at least one tension element engages in each case is thereby ensured, the advantages discussed for the peripheral groove being accordingly obtained to an increased extent.

The tension element is advantageously designed as a cord or strip, in particular such as to be braided or woven. To apply an adjustable tensile force by means of prestressing, the cord or the strip optionally has a certain elasticity. A suitable tension element is also a wire or a wire braid. For the tension element, therefore, recourse may be had to largely conventionally obtainable primary materials, a factor which makes it easier to realize the heat shield brick having the tension element and which, from the cost point of view, also makes use within limits appear very interesting.

In this case, conversion of conventional heat shield bricks according to an embodiment of the present is also possible. The tension elements in the form of a cord or a strip, which are, for example, braided or woven, can be applied to existing conventional heat shield bricks in a simple manner.

According to an embodiment of the present invention, the tension element is made of a ceramic material, in particular of a ceramic fiber material. Ceramic material is resistant to high temperatures and is oxidation- and/or corrosion-resistant and is therefore eminently suitable for the use as a heat shield brick in a combustion chamber. In this case, cords and/or strips preferably consist of ceramic fibers which are suitable for use at up to 1200° C. The chemical composition of these fibers is, for example, 62% by weight of $Al2O3$, 24% by weight of $SiO2$ and 14% by weight of $B2O3$. The fibers in this case are composed of a multiplicity of individual filaments, the filaments having a diameter of about 10 to 12 $\mu$m. The maximum crystallite size in these ceramic fibers is typically 500 nm. Woven fabrics, knitted fabrics, or braids of the desired size and thickness, or even cords or strips, can be produced from the ceramic fiber material in a simple manner. With a tension element of such design, lasting protection of the heat shield brick, even at very high operating temperatures, as occur, for example, in a combustion chamber of a gas turbine, is ensured.

The tension element is preferably at least partly adhesively bonded to the heat shield brick. The adhesive bonding additionally protects the tension element from possible release and correspondingly increases the endurance. When the tension element is adhesively bonded to the heat shield brick, both a conventional adhesive and a high-temperature-resistant adhesive may be used. Silica-based adhesives, which have excellent adhesive properties and a high temperature resistance, may also be used. The use of ceramic or metallic materials for the tension element proves to be especially advantageous for the connection, especially in the case of a ceramic cord or a ceramic strip, since the latter, on account of the fabric structure, has a certain air permeability (porosity), a factor which promotes a sound connection between the tension element and the heat shield brick. The adhesive bonding is especially effective if the configuration with the peripheral groove, in which a tension element engages, is selected. As a result, the adhesive for the adhesive bonding can be let into the peripheral groove, as a result of which an especially sound connection can be produced. In this case, the adhesive may be introduced locally at various points of the peripheral groove or may wet the peripheral groove, for example in the groove root, in certain regions or completely. By the adhesive bonding, the tension element becomes, as it were, an integral component of the heat shield brick, in which case the adhesive bonding can be executed in such a way as to be releasable or, if desired, permanent for an inspection case.

The heat shield brick is preferably made of a ceramic parent material, in particular of a refractory ceramic. By the selection of a ceramic as parent material for the heat shield brick, the use of the heat shield brick up to very high temperatures is reliably ensured, in which case at the same time oxidative and/or corrosive attacks, as occur when a hot medium, e.g. a hot gas, is admitted to the hot side of the heat shield brick, are to a very large extent harmless for the heat shield brick. The tension element can advantageously be effectively connected to the ceramic parent material of the heat shield brick. In this case, the firm connection, as already discussed above, may be configured as a releasable connection. A suitable connection, in addition to the adhesive bonding, is the attachment of the tension element to the peripheral side by means of suitable fastening elements, e.g. by clipping or by a screwed connection. By the selection of a tension element which is made at least partly of a ceramic material, good adaptation to the ceramic parent material of the heat shield brick with regard to the thermomechanical properties is also achieved. By the firm connection between the tension element and the parent material, the heat shield brick is advantageously configured so as to form a type of composite with the tension element. The heat shield brick thus has a compact type of construction and structure which has exceptionally high endurance and passive safety even during high thermal and/or mechanical loading. This is especially advantageous when the heat shield brick is used in a combustion chamber, because, even after an incipient crack or crack through the material, the heat shield function of the heat shield brick continues to be ensured; in particular, it is reliably ensured that no fragments can pass into the combustion space.

In economic terms, this results, on the one hand, in the advantage that no exceptional maintenance and/or inspection of a combustion chamber having the heat shield brick is necessary in the normal operating case. On the other hand, the heat shield brick, in the event of special incidents, has emergency running properties, so that consequential damage to a turbine, for example the blading, can be avoided.

The combustion chamber may be operated at least with the normal maintenance cycles, although the service life can also be prolonged on account of the passive safety increased with the tension element.

The object which relates to a combustion chamber is achieved according to the present invention by a combustion chamber having an internal combustion chamber lining which has heat shield bricks according to the above explanations.

The object which relates to a gas turbine is achieved according to the present invention by a gas turbine having such a combustion chamber.

The advantages of such a combustion chamber or of such a gas turbine follow in accordance with the explanations in respect of the heat shield brick.

Further scope of applicability of the present invention will become apparent from the detailed description given hereinafter. However, it should be understood that the detailed description and specific examples, while indicating exemplary embodiments of the present invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The same designations have the same meaning in the various figures.

Figure 1:
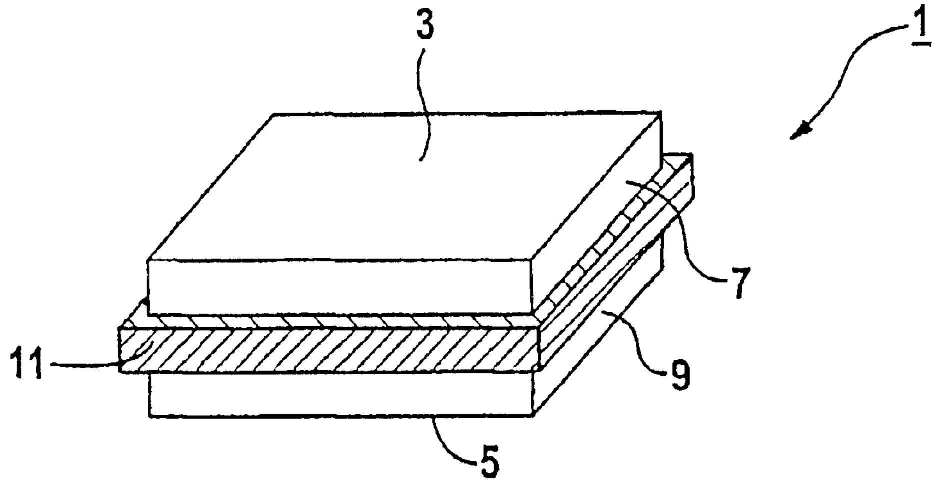
FIG. 1 shows a perspective view of a heat shield brick with tension element.

FIG. 1 shows a heat shield brick 1 in a perspective view. The heat shield brick 1 has a hot side 3 and a wall side 5 opposite the hot side 3. A peripheral side 7 of the heat shield brick 1 adjoins the hot side 3 and the wall side 5. The peripheral side 7 has a peripheral-side surface 9. A hot medium, for example a hot gas, acts on the hot side 3 during use of the heat shield brick. A tension element 11 prestressed in the peripheral direction is provided on the peripheral side 7 of the heat shield brick 1. The tension element is prestressed in such a way that a compressive stress normal to the peripheral-side surface 9 is produced. The tension element may have a certain elasticity in order to produce a prestress in the peripheral direction. A marked increase in the passive safety and thus in the endurance of the heat shield brick 1 during use in a combustion space, for example in the combustion chamber of a gas turbine, is achieved with the tension element 11.

Figure 2:
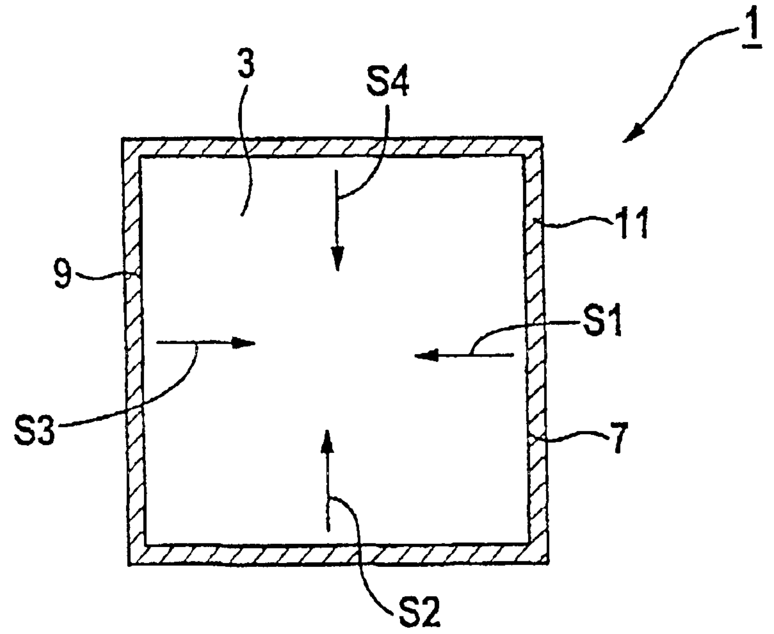
FIG. 2 shows a plan view of the hot side of the heat shield brick in FIG. 1.

As illustrated in FIG. 2, which shows a plan view of the heat shield brick shown in FIG. 1 on the hot side 3, the tension element 11 is attached to the peripheral side over the full periphery of the heat shield brick 1. Compressive forces S1, S2, S3, S4 normal to the peripheral-side surface 9 are produced by the prestressing of the tension element 11 in the peripheral direction. In this case, the compressive forces S1 to S4 are directed inward into the interior of the heat shield brick 1. In the present case, the heat shield brick 1 is designed in a parallelepiped shape, here with a square base area. By the ring closure as a result of the arrangement of the tension element 11 over the entire periphery of the heat shield brick 1, a respective resulting compressive force S1 to S4 is produced on each side surface of the parallelepiped-shaped heat shield brick 1. As a result, the heat shield brick 1 is largely protected against the risk of crack formation or crack propagation on the hot side 3, the wall side 5 or the peripheral side 7. In particular in the event of a crack through the material, the ring closure prevents release of material from the heat shield brick 1. The endurance of the heat shield brick 1 is thereby increased, so that, even in the event of a crack through the material, inspection of the heat shield brick 1 is not necessary, but rather the normal inspection and maintenance cycles or even longer intervals arc achieved. In the event of a crack or shock fracture, the heat shield brick 1 is protected by the tension element 11, since release of possible fragments from the composite of the heat shield brick 1 is only possible with expenditure of effort. The compressive forces S1 to S4 induced by the tension element 11 permanently hold the heat shield brick 1 together. In the present case, the tension element 11 is of strip-shaped geometry. The tension element 11 may in particular be braided or woven.

Figure 3:
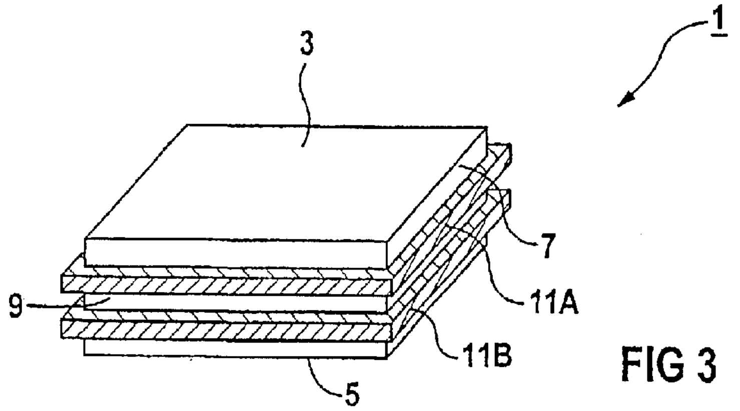
FIG. 3 shows, in a perspective representation, a modified heat shield brick as compared with FIG. 1, FIGS. 4 to 6 each show a view of a heat shield brick with a modified arrangement of the tension element as compared with FIGS. 1 to 3.

A heat shield brick 1 is shown in perspective representation in FIG. 3, the heat shield brick 1, compared with the representation from FIG. 1, having a first tension element 11A and a second tension element 11B. The tension elements 11A, 11B are provided on the peripheral side 7 and are each prestressed in the peripheral direction, so that a compressive stress normal to the peripheral-side surface 9 is produced. The first tension element 11A is arranged on that end of the peripheral side 7 which faces the hot side 3. The tension element 11B is arranged on that end of the peripheral side 7 which is assigned to the wall side 5. By this double protection with two tension elements 11A, 11B prestressed over the entire periphery of the heat shield brick 1, release of possible fragments as a result of shock fracture thermally induced crack formation on the wall side 5 or the hot side 3, respectively, can be reliably avoided both in the region of the hot side 3 and in the region of the wall side 5 as a result of the compressive forces normal to the peripheral-side surface 9.

Figure 4:
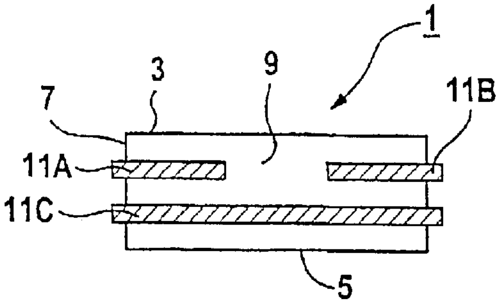
Figure 5:
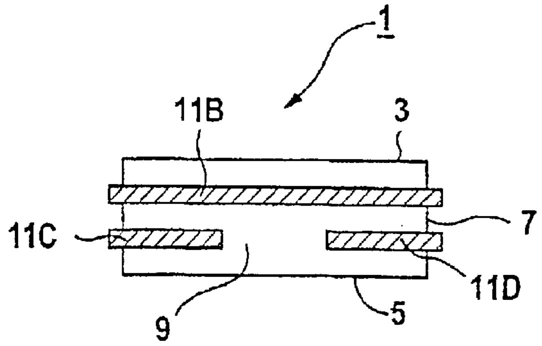
Figure 6:
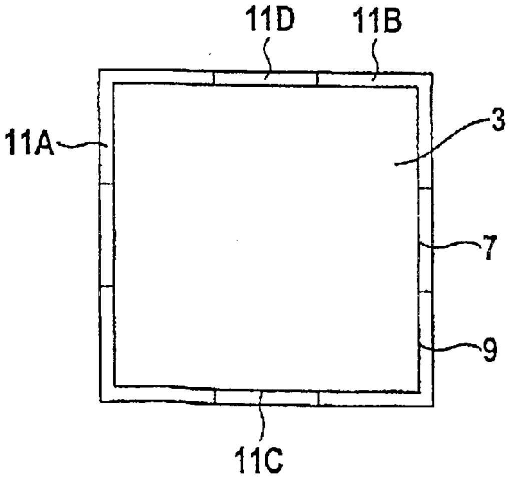

Various views of a heat shield brick 1 are shown in FIGS. 4 to 6. FIG. 4 shows a first side view, FIG. 5 shows a second side view rotated through 90°, whereas FIG. 6 shows a plan view of the hot side 3 of the heat shield brick 1. Four tension elements 11A, 11B, 11C, 11D are provided, which are each attached under prestress to the peripheral side 7. Each of the tension elements 11A to 11D extends over three of the four side surfaces of the parallelepiped-shaped heat shield brick. The tension elements 11A, 11B are provided on that end of the peripheral side 7 which faces the hot side 3. The tension elements 11C, 11D are provided on that end of the peripheral side 7 which faces the wall side 5. By the arrangement of the tension elements 11A to 11D, their total effect results in a ring closure over the entire peripheral-side surface 9 of the heat shield brick (see FIG. 6), so that each of the four side surfaces forming the peripheral side 7 of the parallelepiped-shaped heat shield brick 1 experiences a compressive stress normal to the peripheral-side surface 9. By this configuration, a certain material saving can be achieved in the tension elements 11A to 11D, with virtually the same protective effect relative to a fracture risk such as, for instance, in the configuration shown in FIG. 3.

Figure 7:
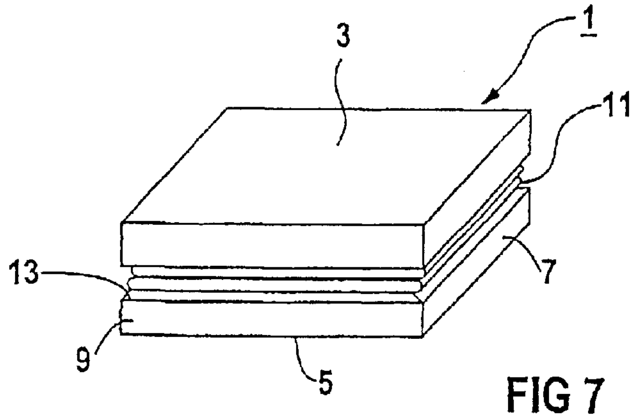
FIG. 7 shows a perspective view of a heat shield brick with peripheral groove, FIG. 8 and FIG. 9 each show a sectional view of a heat shield brick having variants with respect to the peripheral groove.

FIG. 7, in a perspective representation, shows a heat shield brick 1 having a modified configuration compared with FIGS. 1 to 6. The heat shield brick 1 has a peripheral groove 13 on the peripheral side 7. The peripheral groove 13 is formed over the entire periphery of the heat shield brick 1. A tension element 11 engages in the peripheral groove 13. The tension element 11 in the peripheral groove 13 encloses the peripheral-side surface 9 twice. It is also possible for the tension element 11 to enclose the peripheral-side surface 9 several times, in particular three or four times (see FIGS. 8 to 10). By the engagement of the tension element 11 in the peripheral groove 13, the tension element 11 is protected in addition to an increase in the passive safety of the heat shield brick 1. For example, when the heat shield brick 1 is used in a combustion space, direct admission of a hot, corrosive or oxidative gas to the tension element 11 is prevented by the engagement in the groove 13.

Figure 8:
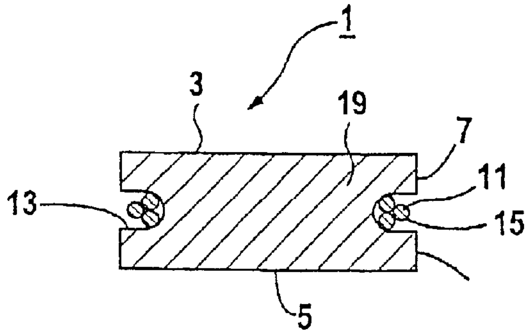
Figure 9:
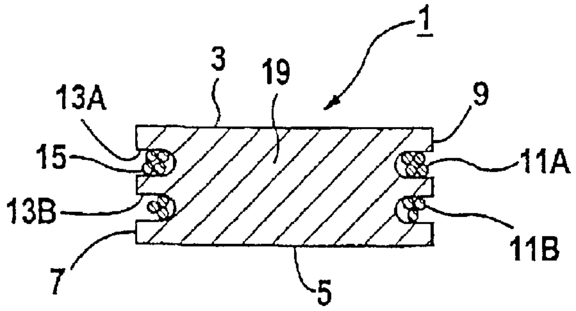

FIGS. 8 and 9 each show a sectional view of a heat shield brick 1. The heat shield brick 1 in FIG. 8 has a peripheral groove 13, whereas the heat shield brick 1 in FIG. 9 has a peripheral groove 13A and a further peripheral groove 13B. A respective tension element 11, 11A, 11B engages in each case in the peripheral grooves 13, 13A, 13B. In this case, the tension elements 11A, 11B, 11C enclose the peripheral-side surface 9 several times. The tension element 11 in the peripheral groove 13 encloses the peripheral-side surface 9 three times (FIG. 8), whereas the tension element 11A encloses the peripheral-side surface 9 four times and the tension element 11B encloses the peripheral-side surface 9 three times. Especially effective protection of the heat shield brick during operation in the event of a shock-fracture risk, crack formation or a crack through the material is ensured by this multiple protection by tension elements 11, 11A, 11B. In this case, the heat shield brick 1 is made of a ceramic parent material 19, in particular of a refractory ceramic. The tension elements 11, 11A, 11B are advantageously likewise made of a ceramic material 15, for example of a ceramic fiber material, which is configured so as to be braided or woven in a strip or cord shape. As a result, simple wrapping of the heat shield brick 1 with the tension elements 11, 11A, 11B while applying a certain prestress in the peripheral direction is possible. The engagement of the tension elements 11, 11A, 11B in the respective peripheral groove 13, 13A, 13B at the same time protects the tension elements 11, 11A, 11B from being released.

In addition to the parallelepiped-shaped geometry of the heat shield brick 1 shown, other prismatic geometries, having a polygonal base area, are possible. It is also possible for the peripheral groove 13, 13A, 13B to only partly enclose the peripheral-side surface 9. The number and arrangement of peripheral grooves 13, 13A, 13B having tension elements 11, 11A, 11B engaging therein can be planned as a function of the respective geometry and the loading case of the heat shield brick 1.

Figure 10:
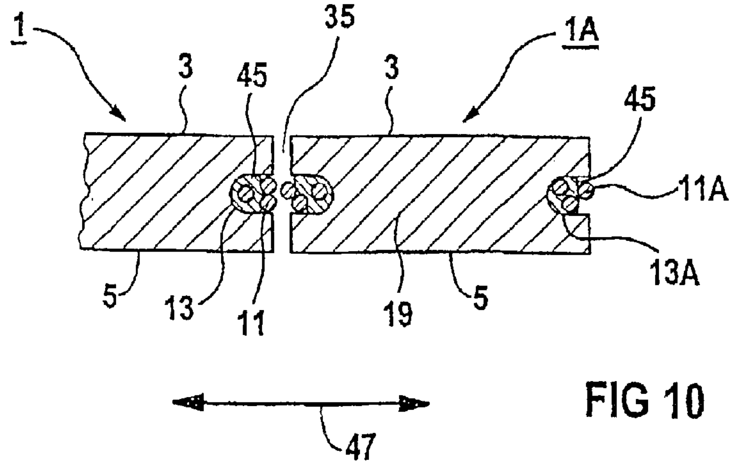
FIG. 10 shows an arrangement with two heat shield bricks.

An arrangement having a heat shield brick 1 and a further heat shield brick 1A is shown in FIG. 10. The heat shield bricks 1, 1A have a respective peripheral groove 13, 13A, in which a respective tension element 11, 11A engages. For additional protection of the tension elements 11, 11A, each of the tension elements 11, 11A is at least partly adhesively bonded to the respective heat shield brick 1, 1A by means of an adhesive 45. The adhesive 45 produces a firm connection between the tension elements 11, 11A and the heat shield bricks 1, 1A in the respective peripheral groove 13, 13A.

In this case, the heat shield brick 1 and the further heat shield brick 1A are arranged with the formation of a gap 35. The gap 35 is closed by the multiple arrangement of the tension elements 11, 11A in the peripheral grooves 13, 13A in such a way that, when a hot medium, for example a hot gas, is admitted to the hot side 3, a possible flow from a region facing the hot side 3 through the gap 35 to a region assigned to the wall side is largely prevented. In the arrangement with the heat shield brick 1 and the further heat shield brick 1A, said heat shield bricks are protected from an overflow of hot gas by the tension elements 11, 11A. In addition to this sealing effect, relative movements of the heat shield bricks 1, 1A along a horizontal shock axis 47 are restricted, shock absorption along the horizontal shock axis 47 being additionally achieved by the adjacently arranged tension elements 11, 11A of the respective heat shield bricks 1, 1A in the region of the gap 35. This is especially advantageous when the heat shield bricks 1, 1A are used in the combustion chamber of a gas turbine, where vibrations may occur as a result of pulsations of the combustion in the combustion chamber and there is a risk of a shock fracture.

Figure 11:
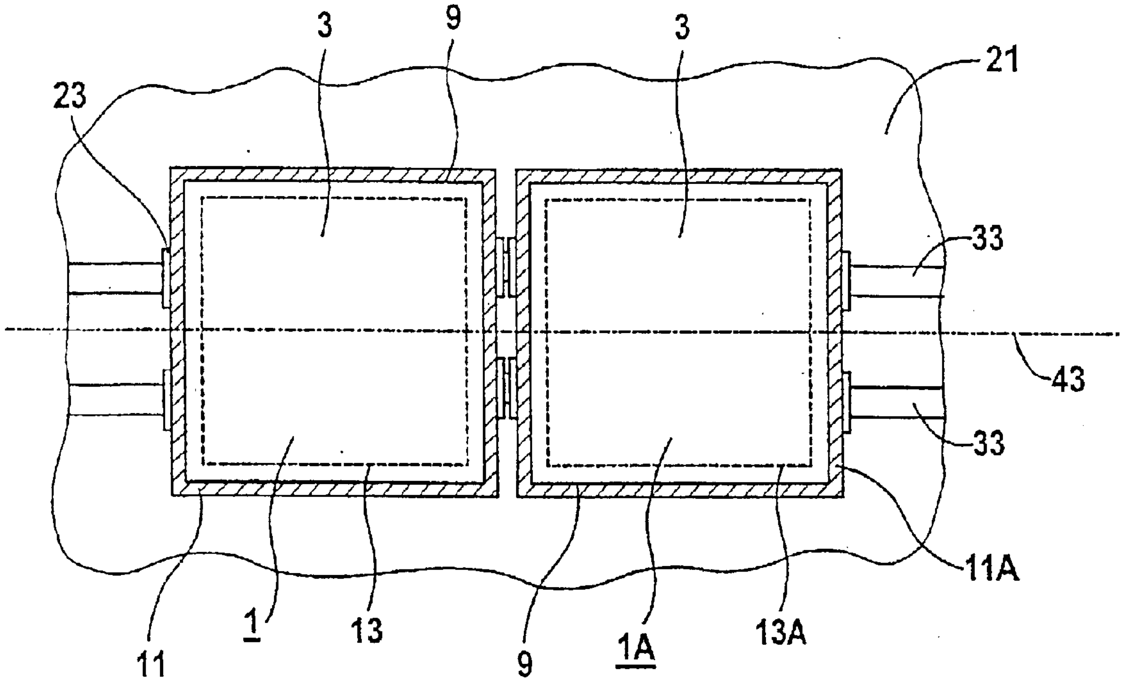
FIG. 11 shows a plan view of an arrangement of heat shield bricks on a supporting wall.

The plan view of an arrangement of a heat shield brick 1 and of a further heat shield brick 1A is shown in FIG. 11. Here, FIG. 11 shows a supporting structure 21, for example a supporting wall, in which fastening grooves 33 are incorporated. The fastening grooves 33 in this case extend along a groove-run axis 43 in the supporting structure 21. The heat shield brick 1 and the further heat shield brick 1A are fastened to the supporting structure 21 via respective fastening elements 23, the heat shield bricks 1, 1A being arranged adjacent to one another along the groove-run axis 43. The plan view in FIG. 11 shows a view of the heat shield bricks 1, 1A on the hot side 3, which during operation is acted upon by a hot gas, for example a combustion gas. Each of the heat shield bricks 1, 1A has a respective tension element 11, 11A. The tension elements 11, 11A engage in a respective peripheral groove 13, 13A of the heat shield bricks 1, 1A, a compressive stress normal to the peripheral-side surface 9 being produced. Such a supporting structure 21 having heat shield bricks 1, 1A fastened thereto is used, for example, in the combustion chamber of a gas turbine. This is to be briefly discussed below with reference to FIG. 12.

Figure 12:
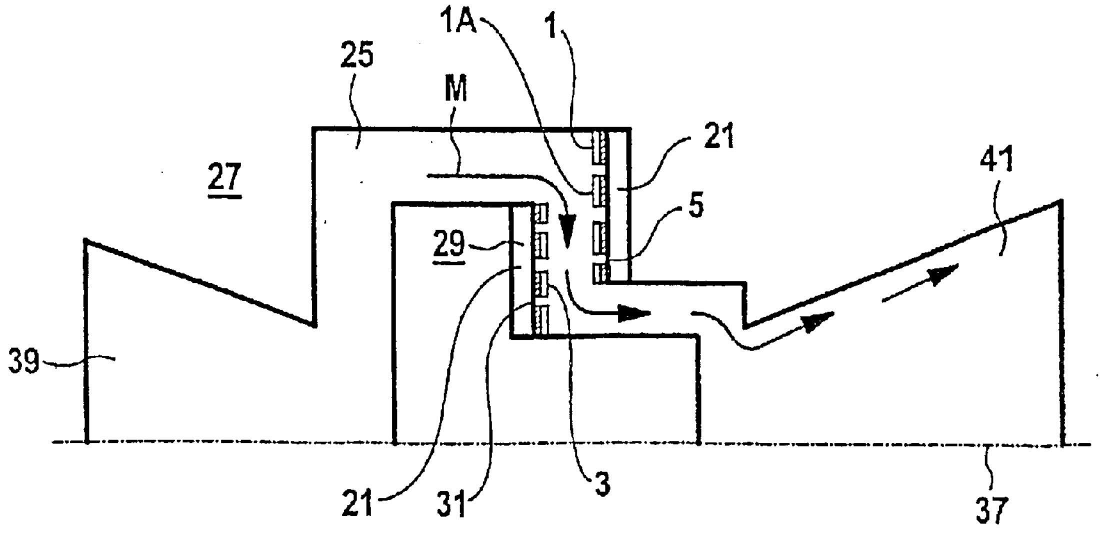
FIG. 12 shows a greatly simplified longitudinal section through a gas turbine.

FIG. 12 shows a gas turbine in a highly schematic longitudinal section. Arranged so as to follow one another along a turbine axis 37 are: a compressor 39, a combustion chamber 25 and a turbine part 41. The combustion chamber 25 is lined on the inside with a combustion chamber lining 29. The combustion chamber lining 29 comprises a combustion chamber wall 31 which at the same time has a supporting structure 21 (cf. also FIG. 11). Furthermore, the combustion chamber lining 29 comprises heat shield bricks 11, 11A, 11B, which are fastened to the supporting structure 21. The heat shield bricks 11, 11A, 11B in this case are designed in accordance with the above explanations. During operation of the gas turbine 27, the heat shield bricks 11, 11A, 11B are acted upon by a hot medium M, in particular a hot gas. This leads to considerable thermal loads on the hot side 3 of the heat shield bricks 11, 11A, 11B. In addition, especially in a gas turbine 27, considerable vibrations may occur, for instance due to combustion chamber humming. In the event of resonance, even shock-like acoustic combustion chamber vibrations having large vibration amplitudes may occur. These vibrations lead to considerable stressing of the combustion chamber lining 29 and of the components enclosed by it, such as, for example, the supporting structure 21 and the heat shield bricks 1, 1A, 1B. By the configuration of the heat shield bricks 1, 1A, 1B having a respective tension element 11, 11A, 11B, the risk of fracture is averted on the one hand and, in the event of fracture or in the event of crack formation, emergency running operation is ensured on the other hand, so that the passive safety is markedly increased compared with conventional heat shield bricks 1, 1A, 1B. The result of this is that the combustion chamber lining 29 has very little susceptibility to shocks or vibrations. In this case, the heat shield bricks 1, 1A, 1B having a tension element 11, 11A, 11B have lasting resistance both to the admission of a hot medium M at the high temperatures, for example up to 1400° C. in a gas turbine 29, and to a high mechanical energy input as a result of shocks and/or vibrations.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A heat shield brick comprising:

a hot side which expose able to a hot medium, a wall side opposite the hot side, and a peripheral side which adjoins the hot side and the wall side and has a peripheral-side surface, wherein a tension element prestressed in the peripheral direction is provided on the peripheral side, whereby a compressive stress normal to the peripheral-side surface is produced.

2. The heat shield brick as claimed in claim 1, wherein the tension element extends at least zonally in the peripheral direction.

3. The heat shield brick as claimed in claim 1, wherein a plurality of tension elements are provided.

4. The heat shield brick as claimed in claim 3, wherein at least one tension element completely encloses the peripheral-side surface.

5. The heat shield brick as claimed in claim 4, wherein the tension element encloses the peripheral-side surface several times.

6. The heat shield brick as claimed in claim 1, wherein the peripheral side has a peripheral groove in which a tension element engages.

7. The heat shield brick as claimed in claim 6, wherein at least one further peripheral groove which is at a distance from the peripheral groove is provided, a tension element engaging in the further peripheral groove.

8. The heat shield brick as claimed in one claim 1, wherein the tension element is designed as a braided or woven cord or strip.

9. The heat shield brick as claimed in claim 1, wherein the tension element is made of a ceramic material made of fiber material.

10. The heat shield brick as claimed in claim 1, wherein the tension element is at least partly adhesively bonded to the heat shield brick.

11. The heat shield brick as claimed in claim 1, wherein the heat shield brick is made of a ceramic parent material having at least a refractory ceramic therein.

12. A combustion chamber having an inner combustion chamber lining at least one heat shield bricks in accordance with claim 1.

13. A gas turbine having a combustion chamber as claimed in claim 12.

14. The heat shield brick as claimed in claim 2, wherein a plurality of tension elements are provided.

15. The heat shield brick as claimed in claim 14, wherein at least one tension element completely encloses the peripheral-side surface.

16. The heat shield brick as claimed in claim 15, wherein the tension element encloses the peripheral-side surface several times.

17. The heat shield brick as claimed in claim 2, wherein the peripheral side has a peripheral groove in which a tension element engages.

18. The heat shield brick as claimed in claim 3, wherein the peripheral side has a peripheral groove in which a tension element engages.

19. The heat shield brick as claimed in claim 4, wherein the peripheral side has a peripheral groove in which a tension element engages.

20. The heat shield brick as claimed in claim 6, wherein the peripheral side has a peripheral groove in which a tension element engages.

* * * * *